United States Patent [19]

Hearn

[11] Patent Number: 4,913,229
[45] Date of Patent: Apr. 3, 1990

[54] COUPLING FOR RELEASING TUBING STRINGS FROM DOWNHOLE TOOLS

[75] Inventor: David D. Hearn, Richardson, Tex.

[73] Assignee: Atlantic Richfield Company, Los Angeles, Calif.

[21] Appl. No.: 193,963

[22] Filed: May 13, 1988

[51] Int. Cl.⁴ .................... E21B 33/16; F16L 37/08
[52] U.S. Cl. ........................................ 166/156; 285/3; 285/18; 403/2; 403/31
[58] Field of Search ............... 166/155, 156, 153, 383, 166/377, 181; 285/18, 3; 403/2, 31, 309, 329

[56] References Cited

U.S. PATENT DOCUMENTS

| | | | |
|---|---|---|---|
| 4,362,211 | 12/1982 | Fisher, Jr. | 166/383 X |
| 4,364,587 | 12/1982 | Samford | 285/18 X |
| 4,452,472 | 6/1984 | Crase | 285/18 X |
| 4,601,492 | 7/1986 | George | 285/18 X |
| 4,809,776 | 3/1989 | Bradley | 166/155 X |

Primary Examiner—Andrew V. Kundrat
Assistant Examiner—Peter M. Cuomo
Attorney, Agent, or Firm—Michael E. Martin

[57] ABSTRACT

Connectors for connecting coilable tubing and other relatively thin walled tubing strings to downhole tools are provided which are releasable to permit withdrawal of the tubing without a member connected to the tubing that is substantially larger in diameter than the tubing itself. One embodiment of the connector includes a body member having plural collet fingers which are engagable with the tubing distal end through cooperating circumferential grooves and lands. The collet fingers are retained in gripping engagement with the tubing by a retainer sleeve having a piston head which catches a pump down ball to block a flow passage in the retainer and allow a fluid pressure force to shear plural shear screws which hold the retainer in the finger engaging position. Alternate embodiments includes recesses formed in the wall of the tubing for receiving ball keys which are held in registration with the recesses by the connector body and a cooperating slidable sleeve member.

15 Claims, 4 Drawing Sheets

COUPLING FOR RELEASING TUBING STRINGS FROM DOWNHOLE TOOLS

BACKGROUND OF THE INVENTION

1. Field of the Invention

The present invention pertains to a coupling or connector mechanism for remote release of an elongated coiled tubing string from a downhole tool so that the tubing string can be retrieved without an enlarged diameter element connected to the lower end of the tubing.

2. Background

The use of coilable steel tubing and similar relatively thin-walled tubing strings for handling downhole tools and other wellbore operations has become increasingly popular. Coilable tubing, in particular, is attractive in that a substantial length of tube may be stored on a spool or reel and uncoiled as required for insertion in the wellbore for inserting and operating various types of tools and for carrying out other wellbore operations. One disadvantage of using this type of tubing, particularly for the insertion and operation of downhole tools, is the predisposition of the tubing to early failure due to the stresses imposed on the tubing from repeated coiling and uncoiling operations. If a tool becomes stuck in the wellbore, it is very likely that the tubing will be parted during an attempt to pull the tubing string and tool out of the well and resulting in a difficult "fishing" or retrieval operation for the length of tubing and the tool left in the well after the tubing failure. Certain types of releasable connectors have been developed for releasing a tubing string from a downhole tool in the event of failure or the tool becoming stuck in the wellbore. However, known types of releasable connectors have an enlarged diameter portion which remains connected to the tubing string and may be the source of interference with respect to being able to withdraw the tubing string from the wellbore.

Accordingly, it has been recognized that it would be desirable to provide a releasable connector or coupling for elongated tubing strings including, in particular, coilable tubing wherein the tubing may be released from the downhole tool and the connector body without having any element connected to the bottom of the tubing which is larger or significantly larger than the diameter of the tubing itself. It is to this end that the present invention has been developed with a view to providing an improved connector or coupling for downhole tools and other devices wherein a tubing string, including coilable tubing, may be remotely disconnected from the downhole tool or device and retrieved from the wellbore at will.

SUMMARY OF THE INVENTION

The present invention provides an improved connector for releasably connecting an elongated tubing string such as a length of coilable tubing to a downhole tool or similar device. In accordance with one aspect of the present invention, there is provided an improved connector which may be operated remotely to an elongated tubing member from a downhole tool so that the tubing retrieved from the wellbore is free of any structure or element connected to the tubing end which is significantly larger in diameter than the diameter of the tubing itself. In particular, embodiments of the invention include those which release the end of the tubing directly from its connection with the connector mechanism so that the tubing is pulled free of the connector in a so-called "slick" condition.

In accordance with another aspect of the present invention there is provided a connector for a downhole tool which is adapted for releasing its connection with an elongated tubing member so that a fishing head or neck is exposed for engagement with a fishing tool for retrieval of the tool and the connector body if some portion of the tool or the connector has become stuck in the wellbore.

The present invention includes embodiments of an improved connector for releasably connecting a tubing string to a downhole tool or other device which may be actuated to effect a release operation by pumping a member down the wellbore within the tubing string for actuation of a release mechanism. At least one embodiment of the invention comprises a connector which is adapted for transmitting torque between the tubing string and a downhole tool or device and which is particularly useful for connecting a downhole rotary motor connected to the tubing. Still another embodiment of the connector or coupling is particularly adapted for connection directly to a downhole motor to reduce the overall length of the motor and the connector mechanism.

The above-described features and advantages of the invention will be further appreciated by those skilled in the art upon reading the detailed description which follows in conjunction with the drawing.

DESCRIPTION OF PREFERRED EMBODIMENTS

Figure 1:
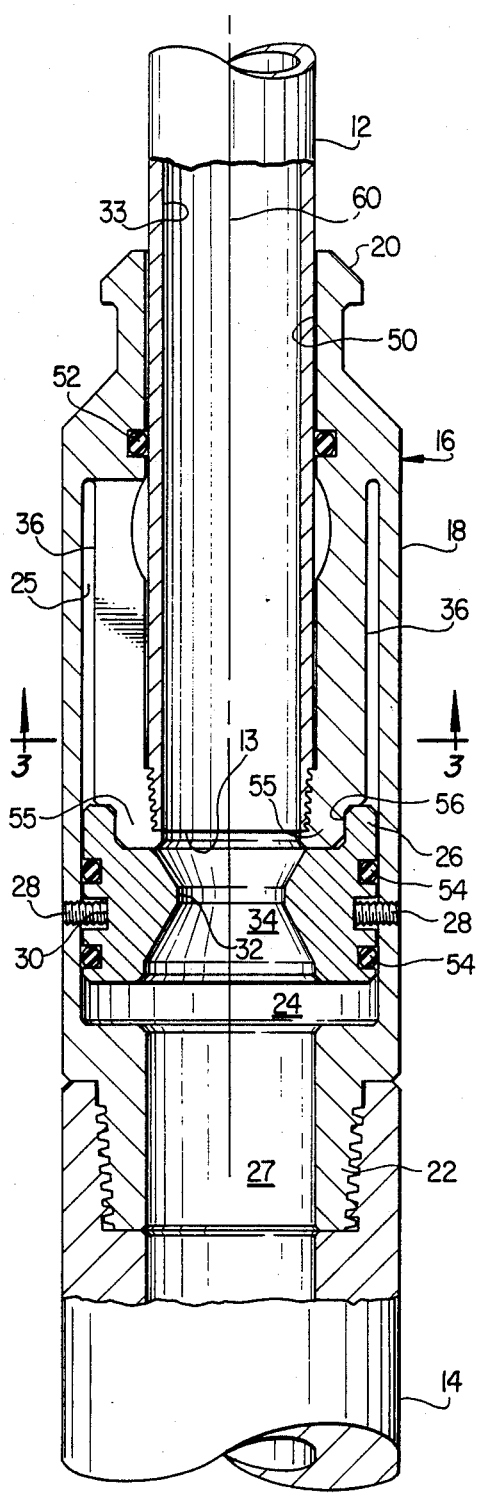
FIG. 1 is a longitudinal central section view of a preferred embodiment of a releasable connector in accordance with the present invention.

In the description which follows like parts are marked throughout the specification and drawing with the same reference numerals, respectively. The drawing figures are not necessarily to scale and certain features or elements may be shown exaggerated in scale in the interest of clarity.

Referring to FIG. 1, there is illustrated a longitudinal central section view of a unique connector for connecting an elongated tubing string such as a steel coilable tube 12 to a downhole tool or other device 14. The tubing 12 is typically of the type used for injection into wellbores to convey tools or other devices deep into the wellbore and to convey fluids between the surface and a selected point in the wellbore. The tubing 12 is typically a relatively thin walled steel tube which may be plastically deformed through repeated coiling and uncoiling operations as a continous length of the tube is inserted in or withdrawn from a wellbore. So-called coiled tubing injection and storage units have been developed, not shown, for handling, injecting and withdrawing the tube with respect to a well. The convenience of this type of wellbore tubing is particularly great due to the portability of the tubing since it may be stored on a spool or reel. Although the present invention is particularly adapted for use with coilable tubing, those skilled in the art will recognize that one or more embodiments described herein may also be used with tubing which is not necessarily adapted for plastic coiling or uncoiling from a storage reel.

The connector illustrated in FIG. 1 is generally designated by the numeral 16 and includes a cylindrical body member 18 having a conventional fishing neck 20 formed on the upper end thereof. The lower end of the body 18 is provided with a conventional threaded box portion 22 for threadedly connecting the body to the tool or device 14. The connector body 18 is typically formed in two parts, although it is illustrated as a single element and is provided with an interior cylindrical cavity 24 in which is disposed a generally cylindrical retaining sleeve 26. The retaining sleeve 26 is secured to the body 18 in a predetermined position by a frangible coupling comprising one or more shear screws 28 which are threaded into the body 18 and project into an annular groove 30 formed in the sleeve 26. The sleeve 26 is also formed with a reduced diameter throat portion 32 which delimits a passage 34 for conducting fluids through the connector 16 by way of the tubing 12. The diameter of the throat 32 is less than the diameter of the tubing wall 3 of the tubing 12.

Figure 3:
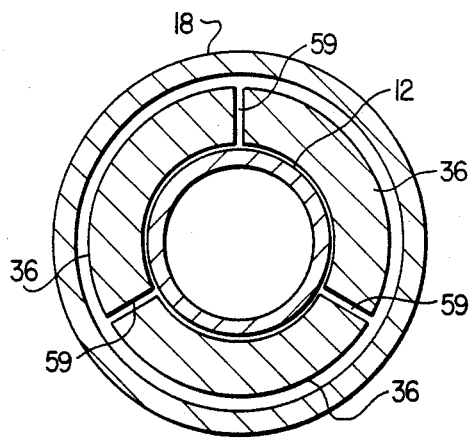
FIG. 3 is a section view taken along the line 3—3 of FIG. 1.
Figure 4:
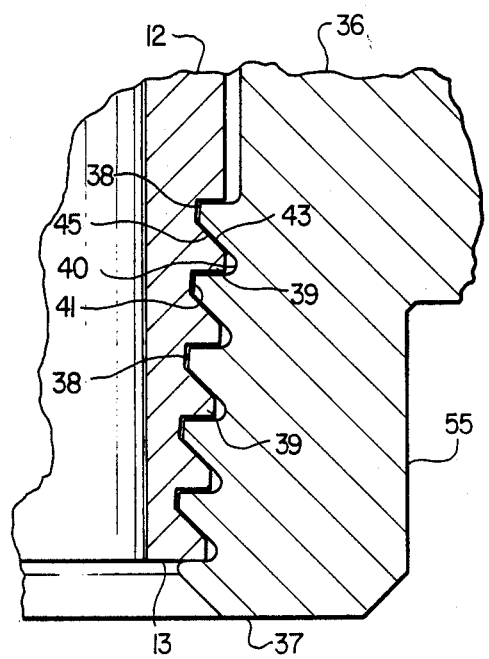
FIG. 4 is a detail section view showing the configuration of the interfitting lands and grooves of the embodiment of FIG. 1.

The connector body 18 is also provided with a plurality of axially extending cantilever collet fingers 36, see FIG. 3 also, which, at their distal ends, are provided with a series of circumferential lands and grooves 38 and 40, respectively. The grooves 40 are of progressively decreasing diameter toward the distal end 37 of the collet fingers 36. Referring also to FIG. 4, the distal end 13 of the tubing 12 is also provided with cooperating lands 39 and grooVes 41 which are also of progressively decreasing diameter toward the distal 13. The cooperating lands 38 and 39 have axially sloping opposed surfaces 43 and 45, respectively.

As illustrated in FIG. 1, the tubing body 18 has an axial bore 50 extending through the fishing neck 20 into the cavity 24 and through which the tubing 12 may be extended into engagement with the distal ends of the collet fingers 36. A suitable O-ring seal 52 is disposed in a groove formed in the body 18 and similar O-ring seals 54 are disposed on the exterior of the sleeve 26 to form a fluid tight cavity portion 25 if the throat 32 is closed off from communicating with the passage portion 27 of the cavity 24. As shown in FIG. 1, each of the collet fingers 36 includes a reduced diameter pilot portion 55 at the distal end 37 which fits within a circumferential recess 56 formed in the sleeve 26.

In the assembled condition of the connector 16 as illustrated in FIG. 1, the tubing 12 is retained connected to the connector body 18 by the interfitting land and groove configuration illustrated in FIG. 1 and FIG. 4. Moreover, the collet fingers 36 are prevented from radial outward displacement by the sleeve 26 which holds the distal ends 37 captive in the recess 56. The sleeve 26 is, of course, retained in the position for capturing the ends of the collet fingers 36 by the shear screws 28.

Figure 2:
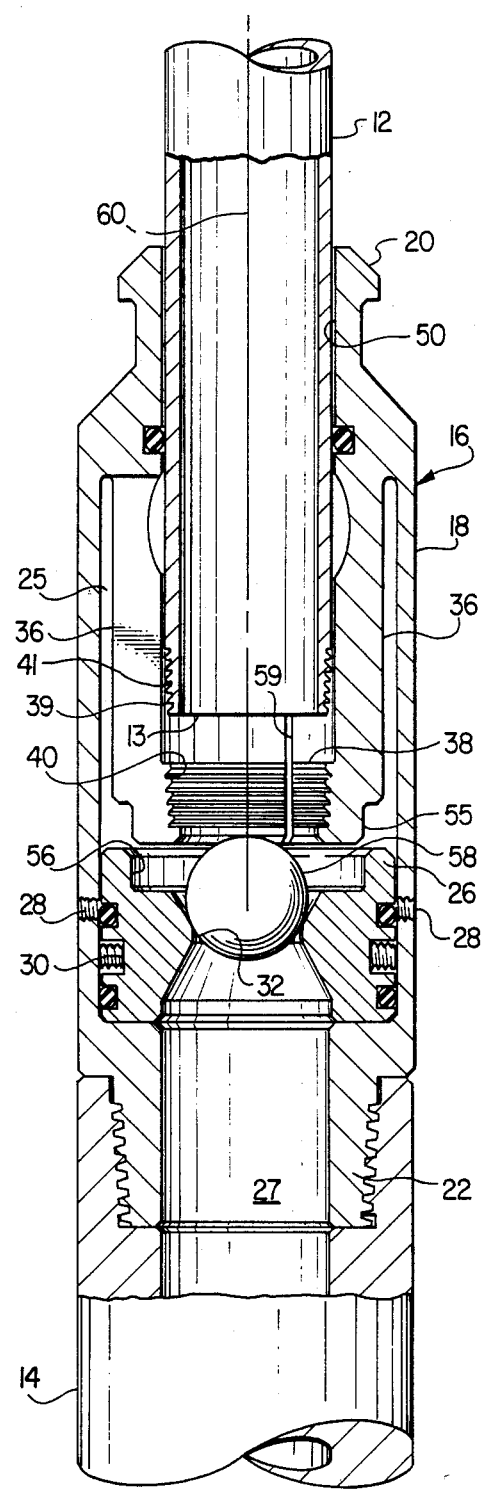
FIG. 2 is a view similar to FIG. 1 showing the connector in the tubing released condition.

Referring now to FIG. 2, there is illustrated the condition wherein the connector 16 has been operated to release the tubing 12 from the body 18 for retrieval of the tubing uphole and wherein there is no element remaining connected to the tubing end 1 which is greater than the outer diameter of the tubing itself. This greatly facilitates the retrieval of coilable tubing while exposing the fishing neck 20 for engagement by a conventional fishing tool, not shown, for subsequent retrieval of the tool or device 14 if such becomes stuck in the wellbore.

In order to effect release of the tubing 12 from the connector 16, a generally spherical ball member 58, FIG. 2, is inserted in the tubing 12 at the surface and pumped down through the tubing under the urging of pressure fluid until it engages the throat 32 of the sleeve 26 to form a substantially fluid tight seal. The ball member 58 is only slightly less in diameter than the diameter of the inner wall surface 33 of the tubing 12 and is pumped down the tubing 12 from a suitable point, not shown at the surface. When the ball member 58 has been seated in the sleeve throat 32. Fluid enters the cavity 25 through clearance spaces 59 formed between the collet fingers 36 and fluid pressure is increased sufficiently to shear the screws 28 and displace the sleeve 26 to the position shown in FIG. 2. In this position of the sleeve 26 the collet fingers 36 are free to have their distal ends 37 flexed radially outwardly with respect to the longitudinal central axis 60. When the ball 58 is seated in the throat 32, fluid in the cavity 25 acts across substantially the full diameter of the sleeve 26 to effect a substantial pressure force acting on the shear screws 28. When the fingers 36 have been released from the engagement with the sleeve 26, a moderate upward pulling effort on the tubing 12 will effect the radial outward flexing of the fingers 36 due to interaction between the land surfaces 43 and 45. Moreover, the collet fingers 36 may be formed to have a radial outward bias or elastic memory predetermined.

As will be appreciated from the foregoing description, the tubing 12 may be pulled free of the connector 16 in a so-called "slick" condition, that is, without any element or member connected to the tubing which is substantially greater in diameter than the tubing itself. This greatly facilitates withdrawal of the tubing from the wellbore and minimizes the chance of parting the tubing at some point between the tool 14 and the surface which would result in complicated and risky efforts to retrieve the tubing portion and the tool remaining in the wellbore.

Figure 5:
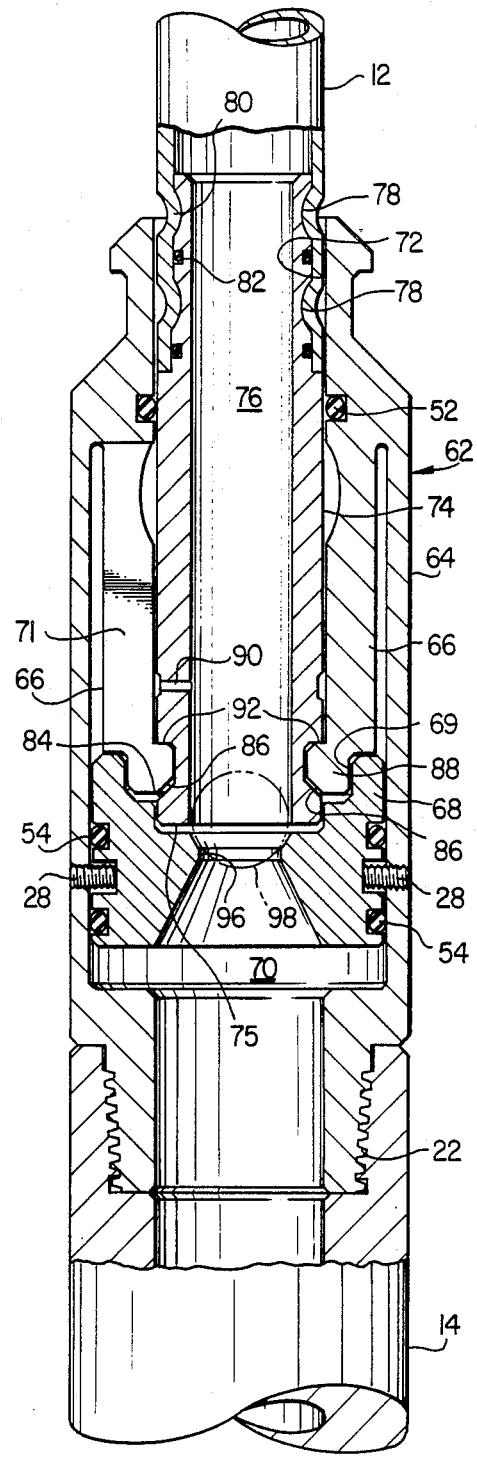
FIG. 5 is a central longitudinal section view of a first alternate embodiment of the present invention.

Referring now to FIG. 5, an alternate embodiment of a connector in accordance with the present invention is illustrated and generally designated by the numeral 62. The connector 62 includes a cylindrical body member 64 similar to the body 18, but having modified collet fingers 66 provided thereon and a modified cooperating retaining sleeve 68 disposed in a cylindrical cavity 70 formed in the connector body. The connector body 64 also includes the conventional fishing neck portion 20, box portion 22 and an axial bore 72 in the neck portion opening into the cavity 70 for receiving the lower end of the tubing 12. In certain applications, if the tubing 12 is of relatively small diameter or thin wall, it may be necessary and desirable to provide the distal end of the tubing with a connector member 74 comprising a generally cylindrical element having a reduced diameter passage 76 formed therein and having an upper end provided with spaced apart circumferential recesses or grooves 78. The grooves 78 are adapted to receive radially inwardly displaced portions 80 of the tubing 12 which may be provided by a cold rolling or similar metal displacement operation to form a high strength connection between the tubing 12 and the member 74. Suitable O-ring seals 82 are provided to form a fluid tight connection between the tubing 12 and the member 74. The distal end 75 of the connector member 74 is also provided with a circumferential groove or recess 82 having an axially sloping annular surface 84 which is engageable with a cooperating surface 86 formed on each of the ends 88 of the respective collet fingers 66. A small, radially projecting passage 90 is formed in the member 74 to permit passage of fluid from the interior passage 76 into the body cavity portion 71 disposed above the sleeve 68.

The sleeve 68 is also provided with a cylindrical recess 69 for receiving the distal ends of the collet fingers 66 for retaining the collet fingers in engagement with the member 74 by radially inwardly projecting flange portions 92 formed on the fingers, respectively. The flange portions 92 include the axially sloping surfaces 86 engagable with the surface 84 of the connector member 74. The sleeve 68 is also provided with an axial central through passage defined in part by a reduced diameter throat portion 96 for forming a fluid tight stop for a ball member 98 which, when pumped through the tubing 12 and the member 74, becomes seated to provide for pressuring the cavity 71 to exert a sufficient fluid pressure force on the sleeve 68 to shear the screws 28 and displace the sleeve downwardly, viewing FIG. 5, to release the collet fingers 66 for radial outward movement.

Accordingly, in response to the sleeve 68 being displaced downwardly and clear of the distal ends 88 of the fingers 66 the tubing 12 and connector member 74 may be retrieved by exerting an upward pulling force thereon to forcibly move the collet fingers radially outwardly in response to a radially directed force component acting on the surfaces 86. As previously mentioned, the collet fingers 66 may also be provided with a radial outward bias or elastic memory to facilitate their release of the tubing 12 and connector member 74 in response to displacement of the sleeve 68. The connector 62 is particularly useful in applications wherein the dimensions of the tubing 12 do not permit formation of the circumferential lands and grooves, as illustrated for the embodiment of FIGs. 1 through 4, or where field installation of the connector 62 may be more easily carried out by installing the member 74 on the distal end of the tubing 12. The diameter of the passage 76 is not significantly less than the inside diameter of the tubing 12 and minimal flow losses are encountered during normal operation of the tool 14.

Figure 6:
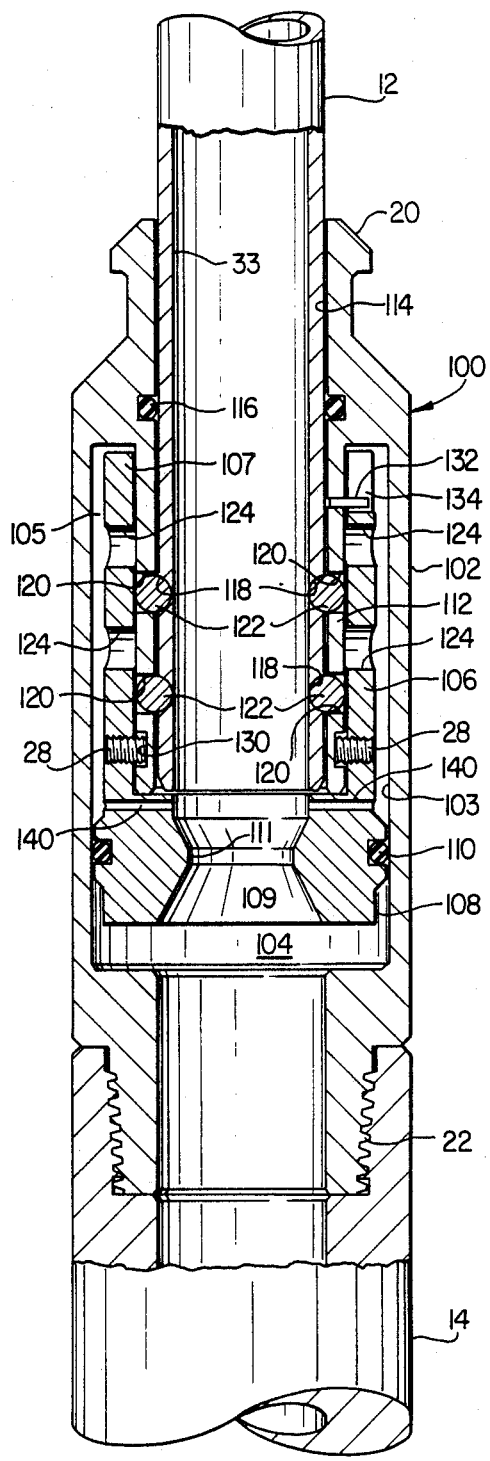
FIG. 6 is a central longitudinal section view of a second alternate embodiment of the present invention adapted for transmitting torque between the tubing string and the downhole tool.
Figure 7:
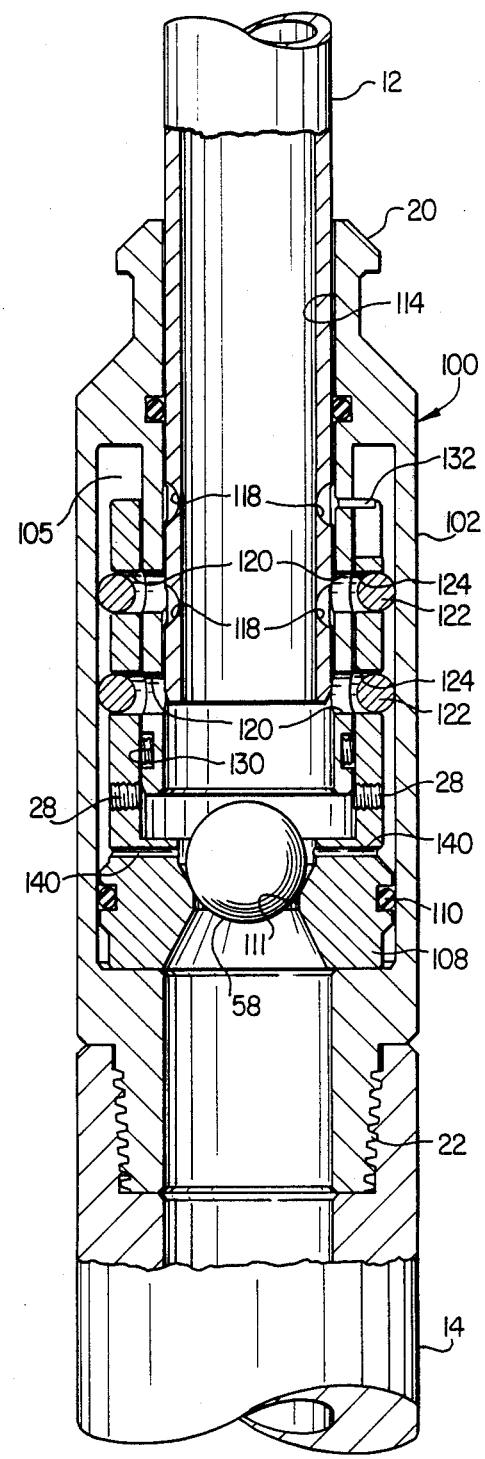
FIG. 7 is a view similar to FIG. 6 showing the connector in the tubing released condition.

Referring now to FIGS. 6 and 7, a second alternate embodiment of a connector in accordance with the present invention is illustrated and generally designated by the numeral 100. The connector 100 is particularly adapted for use in applications wherein torsional forces are exerted between the tool 14 and the tubing 12 and resistance to this torsional effort is required such as in instances where the tool 14 includes a downhole rotary motor or the like. The connector 100 includes a connector body comprising a generally cylindrical member 102 having a conventional fishing neck portion 20 disposed at its upper end and a reduced diameter box portion 22 disposed at its lower end. As with the other embodiments of the connector body described heretofore, the body 102 may be fabricated of separable parts to facilitate formation of a generally cylindrical cavity 104 within the body and the assembly thereinto of an elongated sleeve 106 disposed in the cavity 104 and formed integral with a piston head portion 108. The piston head 108 includes an O-ring seal 110 which is in sealing engagement with the interior wall 103 of the body 102 in a manner similar to the arrangement of the previous described connector embodiments.

The sleeve 106 is disposed over an axially extending tubular portion 112 of the body 102 extending within the cavity 104 and defining in part a cylindrical bore 114 for receiving the lower distal end of the tube 12. The tube 12 is disposed in close fitting relationship within the bore 114 and a fluid tight seal is formed by an O-ring 116 disposed in a suitable groove in the body 102. The tube 12 is also adapted to have a plurality of axially and radially spaced recesses or openings 118 formed therein which are adapted to be aligned with corresponding openings 120 formed in the tubular portion 112 of the body member. The openings 120 are each large enough to receive respective ball keys 122 which are also fitted in the recesses or openings 118 to prevent axial displacement of the tube 12 from the connector body 102 when the ball keys are in registration with both the openings 120 and the recesses or openings 118. In the position of the sleeve member 106 illustrated in FIG. 6, the ball keys 118 are retained against displacement from the recesses 118 by the close fitting relationship of the inner diameter 107 of the sleeve 106 with the outer surface of the tubular portion 112. As illustrated in FIG. 6, the sleeve 106 is also provided with corresponding axial and circumferentially spaced openings 124 which are large enough to receive the ball keys 118 when the sleeve 106 is displaced into registration with the openings 120 as illustrated in FIG. 7.

The sleeve 106 is secured in the position illustrated in FIG. 6 with respect to the tubular portion 112 by a plurality of shear screws 28 which are threadedly engaged with the sleeve 106 and project into a groove 130 formed in the distal end of the tubular portion 112. The sleeve 106 is rotationally located with respect to the tubular portion 112 by a pin type key 132 secured to the tubular portion 112 and projecting into an axial extending groove or keyway 134 formed in the sleeve 106 for aligning the openings 124 with the openings 120. The piston head portion 108 is provided with an axial passageway 109 delimited partially by a throat portion 111 which is somewhat less in diameter than the inside diameter 33 of the tube 12. Radially extending passages 140 open into the passage 109 for communicating pressure fluid into the cavity portion 105.

Referring to FIG. 7, the connector 100 is illustrated in the condition wherein the tube 12 has been released from the connector body 102 by pumping the ball closure member 58 down through the tubing interior until it is seated against the throat 111 and the fluid pressure in the cavity 105 has increased sufficiently to axially displace the sleeve 106 downwardly to shear the screws 28 and place the openings 124 in registration with the openings 120. In this position of the sleeve 106, the ball keys 122 may be displaced radially outwardly clear of the recesses 118 so that the tubing 12 is free to be pulled out of the connector body 102, which condition is illustrated in process in the view of FIG. 7. As shown in FIG. 7, in particular, the configuration of the recesses or openings 118 is such that the ball keys 118 are biased radially outwardly in response to an axial pulling force on the tubing 12 to assure that they are displaced from the recesses. Accordingly, as with the previous embodiments of the connector described herein, the connector 100 is adapted to release from the tubing 12 such that the tubing may be withdrawn in a "slick" condition without any radially projecting connector member portions or other structure members connected thereto.

Figure 8:
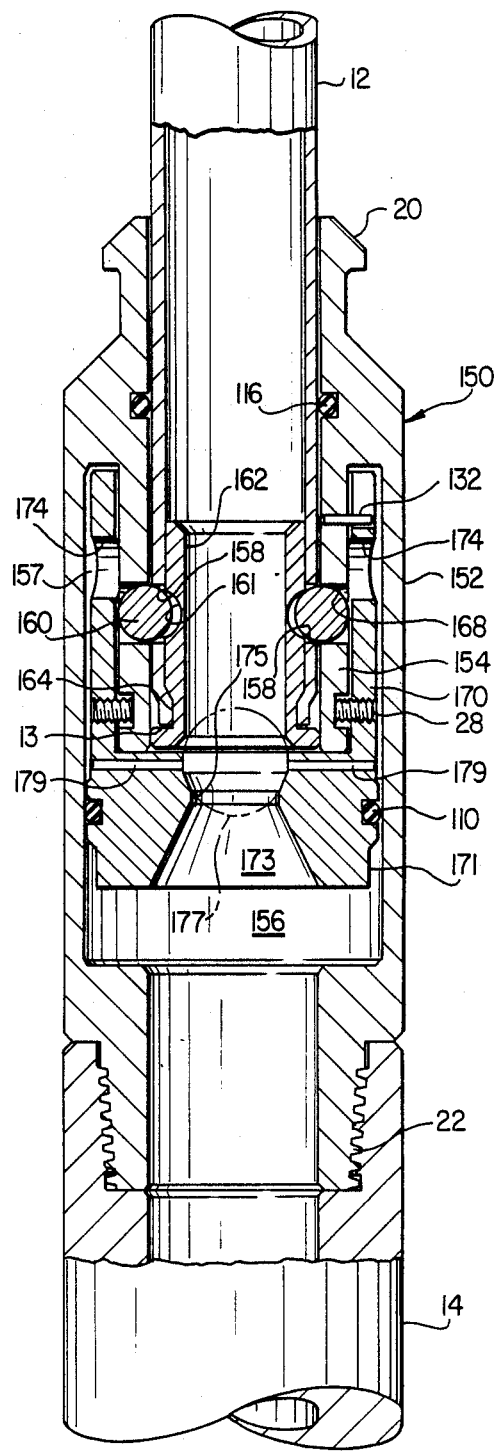
FIG. 8 is a central longitudinal section view of a third alternate embodiment of the connector of the present invention.

Referring now to FIG. 8, a further embodiment of the present invention is illustrated as comprising a connector generally designated by the numeral 150. The connector 150 includes a body 152 similar in some respects to the body 102 having an axially projecting tubular portion 154 extending within a hollow, cylindrical cavity 156 between a fishing neck portion 20 and a lower threaded box portion 22. In certain applications of tubing connectors with downhole tools the strength of the tubing may be insufficient to provide for the ball key connection by simply providing recesses in the tubing itself. Accordingly, in the embodiment illustrated in FIG. 8, the lower end of the tubing 12 is provided with opposed openings 158 for receiving relatively large diameter ball keys 160, which ball keys also project into recesses formed in a reinforcement sleeve insert 162. The sleeve insert 162 is secured to the tubing 12 by cold rolling the distal end 1 of the tubing to displace it radially inwardly into a groove 164 formed in the insert 162. The reinforcement insert 162 provides a reinforced portion of the tubing 12 having a larger recess 161 for receiving the relatively large diameter ball key 160 which is also in registration with opposed openings 168 formed in the tube portion 154.

A modified sleeve member 170 is disposed over the tube portion 154 and is secured thereto by shear screws 28 projecting into a groove or recess 155. The sleeve 170 is also provided with openings 174 for registration with the openings 168 upon axial movement of the sleeve downwardly, viewing FIG. 8, after the screws 28 have been sheared. The sleeve 170 includes a piston head portion 171 having an axial passage 173 formed therein and delimited partially by a throat 175 for trapping a pump down ball closure member 177 in the same manner as the embodiments previously described. Radial passages 179 open into cavity portion 157 for communicating pressure fluid to act on the sleeve 170. The sleeve 170 is aligned with the tubular portion 154 by a pin key 132 projecting into an axial slot 159.

Figure 9:
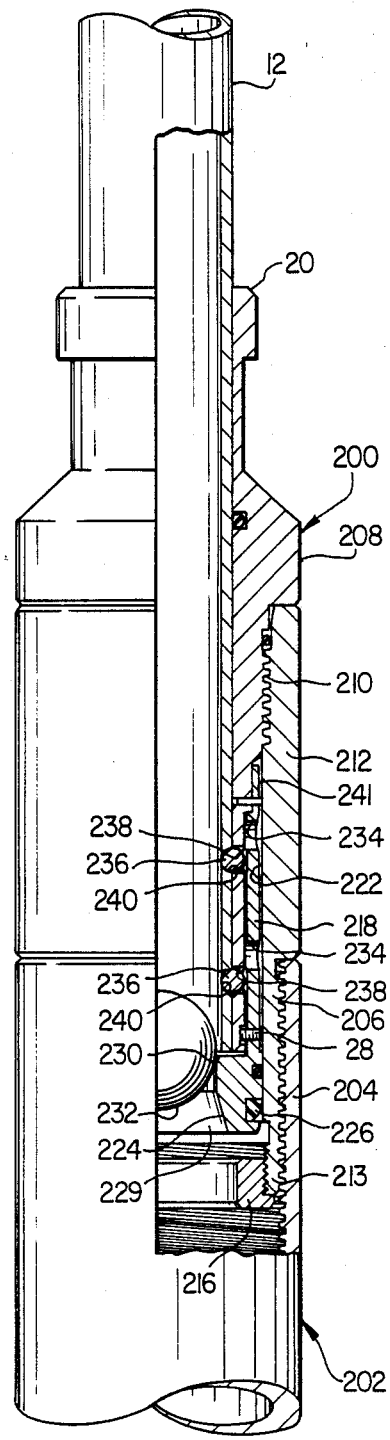
FIG. 9 is a central longitudinal section view of a fourth alternate embodiment of a connector in accordance with the invention and which is adapted for connection directly to a downhole motor.

Referring now to FIG. 9, a fourth alternate embodiment of a tool connector for coilable tubing and the like is illustrated and generally designated by the numeral 200. The connector 200 is particularly adapted for connecting the tubing 12 directly to a downhole rotary motor 202 having a cylindrical barrel type outer casing 204 which is internally threaded at its upper end 206 as illustrated. The connector 200 includes a body member 208 having a fishing neck 20 formed on the upper end thereof and an externally threaded portion 210 for threadedly coupling the body member to a separable part 212. The separable body part 212 is also provided with external threads at its lower distal end 213 for threadedly connecting the connector 200 to the motor casing 204 in a short close coupled configuration.

The body part 21 is also threadedly engaged at its lower end 213 with a retaining ring 216 for retaining a sleeve member 218 in sleeved relationship over a lower extension 220 of the body member 208 and in slidable relationship with respect to the inner wall surface 222 of the body part 212. The sleeve 218 includes a head portion 224 at its lower end and which is provided with a seal ring 226 for sealing engagement with the wall surface 222. The head portion 224 includes an axial passage 229 delimited by a throat 230 for seating a ball type closure member 232. The sleeve 218 is provided with spaced apart openings 234 for receiving radially displaceable ball keys 236 which, in the position of the connector shown in FIG. 9, are in registration with openings 238 formed in the body extension 220 and corresponding recesses or openings 240 formed in the distal end of the tube 12. The sleeve 218 and the body extension 220 are secured together by one or more shear screws 28.

In response to pumping the ball closure member 232 down through the tube 12 to seat against the throat 230, fluid pressure may be increased in an annular cavity 241 formed between the connector body members 208 and 212 and the piston head portion 224 to effect downward axial force on the sleeve 218 sufficient to shear the screws 28 and displace the sleeve such that the openings 234 are in registration with the openings 238 whereby the ball keys 236 may be displaced out of the recesses 240 and the tubing 12 withdrawn from the connector 200 to expose the fishing head 20 for retrieval of the motor 202, as needed. Fluid may flow between the tubing 12 and the cavity 241 through leakage paths formed between the tube 12, the body extension 220 and the sleeve 218.

The construction and operation of the various embodiments of the present invention as described herein are believed to be readily understandable in view of the foregoing explanation taken in conjunction with the drawing figures. The embodiments of the invention may be constructed using conventional engineering materials for downhole tools used in the oil and gas industry and also utilizing conventional manufacturing processes.

Although preferred embodiments of the present invention have been described in detail herein, those skilled in the art will recognize that various substitutions and modifications may be made without departing from the scope and spirit of the invention as recited in the appended claims.

What is claimed is:

1. A releasable connector for connecting an elongated tube member to a downhole tool comprising:
   a connector body including means defining a bore for receiving the distal end of a generally cylindrical tube member;
   means supported on said body and engagable with an end of said tube member and forming a releasable connection between said connector and said tube member whereby said tube member may be withdrawn from said body in a condition such that the end of said tube member retrievable from said connector is not significantly greater in diameter than the outer diameter of another portion of said tube member; and
   retaining means operable to retain said means forming said connection in a position to retain said tube member connected to said connector, said retaining means including piston means disposed in said body and including passage means formed in said piston means for receiving a closure member to provide for increasing the fluid pressure acting on said piston means to permit said means forming said connection to release said tube member from said connector whereby said tube member may be withdrawn from said body.

2. The apparatus set forth in claim 1 wherein:

said means forming said connection comprises a plurality of collet fingers engagable with said tube member and said retaining means includes means for holding said collet fingers in a position engaging said tube member to retain said tube member connected to said body.

3. The apparatus set forth in claim 2 wherein:

said tube member includes circumferential land and groove means formed thereon and engagable with cooperating land and groove means formed on said collet fingers for retaining said tube member connected to said collet fingers.

4. The apparatus set forth in claim 3 wherein:

said lands on said tube member and said collet fingers have cooperating surfaces formed thereon responsive to a pulling force on said tube member to radially displace said collet fingers with respect to the central axis of said tube member to permit said tube member to be withdrawn from said body.

5. The apparatus set forth in claim 2 wherein:

said tube member includes an extension part having an outer diameter substantially the same as the outer diameter of said tube member and secured to the distal end of said tube member, said extension part including a surface engagable with said collet fingers for retaining said extension part and said tube member connected to said body in a first position of said retaining means, and cooperating surface means on said extension part and said collet fingers responsive to an axial pulling force on said tube member upon movement of said retaining means to a position to release said collet fingers to permit movement of said collet fingers to release engagement with said extension part.

6. The apparatus set forth in claim 1 wherein:

said piston means is secured against movement relative to said body by shear pin means interposed between said body and said piston means.

7. The apparatus set forth in claim 1 wherein:

said means forming said connection comprises key means engagable with said tube member and with means connected to said body for retaining said tube member connected to said body, and said retaining means comprises a member connected to said piston means and movable with said piston means between a first position for retaining said key means in engagement with said tube member and a second position for permitting movement of said key means to release said connection between said body and said tube member.

8. The apparatus set forth in claim 7 wherein:

said tube member includes a reinforcement member connected to the distal end thereof and including recess means formed therein for receiving said key means for retaining said tube member connected to said body.

9. A connector for connecting an elongated generally cylindrical thin walled tube to a downhole tool or the like comprising:

a body including a fishing neck disposed on an upper end thereof, said body including a generally cylindrical internal cavity and an axial bore for receiving the distal end of said tube, said body including a tubular extension part adapted to be disposed in sleeved relationship over said tube;

plural key means disposed in cooperating recess means formed in said tube and corresponding openings formed in said extension part for retaining said tube connected to said body; and sleeve means disposed in said cavity in sleeved relationship over said extension part and operable in a first position to maintain said key means in registration with said extension part and said tube to prevent disconnection of said tube from said body, said sleeve means being movable under the urging of pressure fluid to a second position to align corresponding openings formed in said sleeve means with said openings in said extension part to permit movement of said key means out of engagement with said tube so that said tube may be withdrawn from said body.

10. A connector for connecting an elongated generally cylindrical thin walled tube to a downhole well motor and the like, said motor including a casing having an end part, said connector comprising:

a body comprising a body member having a fishing neck portion disposed at one end thereof, said body member including means forming a bore for receiving a distal end of said tube;

an adapter part connected to said body member and to said casing, said adapter part comprising a generally cylindrical member defining with said body member an annular cavity;

a sleeve member disposed in said annular cavity and axially slidable relative to said adapter part and said body member between a first position and a second position, said sleeve member including a piston head portion for receiving a closure ball conducted through said tubing to said connector;

frangible coupling means interconnecting said sleeve and said body for holding said sleeve member in said first position;

cooperable recess means and opening means in said tube and said body, respectively, for receiving key means for holding said tube secured to said body in said first position of said sleeve member, said key means being movable upon movement of said sleeve to said second position to release said connection between said tube member and said body in response to a pressure fluid force acting on said piston head portion to move said sleeve member from said first position to said second position.

11. The apparatus set forth in claim 10 including:

means forming cooperating openings in said sleeve member for registration with said openings in said body member for receiving said key means upon movement of said key means out of engagement with said tube.

12. The apparatus set forth in claim 11 wherein:

said sleeve member includes means engagable with means on said body member for rotationally aligning said openings on said sleeve member with said openings in said body member.

13. A releasable connector for connecting an elongated tube member to a downhole tool comprising:

a connector body including means defining a bore for receiving the distal end of a generally cylindrical tube member;

a plurality of collet fingers supported on said body and engagable with said end of said tube member and forming a releasable connection between said connector and said tube member whereby said tube member may be withdrawn from said body in a condition such that the end of said tube member retrievable from said connector is not significantly greater in diameter than the outer diameter of another portion of said tube member; and retaining means for holding said collet fingers in a position engaging said tube member to retain said tubes member connected to said body, said retaining means including piston means disposed in said body and responsive to a pressure fluid force to move said retaining means from a position engaging said collet fingers to a position releasing said collet fingers for movement to discharge from said tube member whereby said tube member may be withdrawn from said body, said piston means including passage means formed therein having a portion defined by a throat, said throat having a diameter less than the inside diameter of said tube member for receiving a closure member in said throat to block the flow of fluid through said connector to provide for increasing the fluid pressure acting on said piston means.

14. A connector for connecting an elongated generally cylindrical thin walled tube to a downhole tool or the like comprising:

a body including a fishing neck disposed on an upper end thereof, said body including a tubular extension part adapted to be disposed in sleeved relationship over said tube;

plural key means disposed in cooperating recess means formed in said tube and corresponding openings formed in said extension part for retaining said tube connected to said body; and sleeve means disposed in said cavity in sleeved relationship over said extension part and operable in a first position to maintain said key means in registration with said extension part and said tube to prevent disconnection of said tube from said body, said sleeve means including a piston head portion having a central passage therethrough and delimited at least partially by a throat portion having a diameter less than the interior diameter of said tube for receiving a closure member to close off the flow of fluid through said connector and provide for increasing the pressure of fluid in said cavity to move said sleeve means from said first position to a second position to align corresponding openings formed in said sleeve means with said openings in said extension part to permit movement of said key means out of engagement with said tube so that said tube may be withdrawn from said body.

15. A connector for connecting an elongated generally cylindrical thin walled tube to a downhole tool or the like comprising:

a body including a generally cylindrical internal cavity and an axial bore for receiving the distal end of said tube, said body including a tubular extension part adapted to be disposed in sleeved relationship over said tube;

plural ball keys disposed in cooperating recess means formed in said tube and corresponding openings formed in said extension part for retaining said tube connected to said body; and sleeve means disposed in said cavity in sleeved relationship over said extension part and operable in a first position to maintain said keys in registration with said extension part and said tube to prevent disconnection of said tube from said body, said sleeve means including a piston portion having passage means therein for receiving a closure member to provide for increasing fluid pressure acting on said piston portion to move said sleeve means to a second position to align corresponding openings formed in said sleeve means with said openings in said extension part to permit movement of said key means out of engagement with said tube to that said tube may be withdrawn from said body.

* * * * *